United States Patent
Beauquin

[19]
[11] Patent Number: 5,858,489
[45] Date of Patent: Jan. 12, 1999

[54] SYSTEM FOR THERMAL AND/OR ACOUSTIC INSULATION OF A TUBE

[75] Inventor: Jean-Louis Beauquin, Saint Faust, France

[73] Assignee: Elf Aquitaine Production, France

[21] Appl. No.: 742,824

[22] Filed: Oct. 31, 1996

[30] Foreign Application Priority Data

Nov. 16, 1995 [FR] France .................................. 95 13601

[51] Int. Cl.⁶ .............................. E21B 36/00; B29C 39/00
[52] U.S. Cl. ................... 428/36.5; 428/36.9; 428/36.91; 264/414; 264/415; 252/315.6; 423/338; 138/149; 285/47; 285/369; 166/242.1; 166/292; 166/302
[58] Field of Search ................................. 428/35.7, 36.5, 428/36.9, 36.91, 36.92; 174/DIG. 8; 423/338, 335; 252/315.6; 138/149; 285/47, 369; 166/242.1, 242.4, 292, 302; 264/414, 415

[56] References Cited

U.S. PATENT DOCUMENTS

| | | | |
|---|---|---|---|
| 4,954,327 | 9/1990 | Blount | 423/338 |
| 5,154,954 | 10/1992 | Croop et al. | 428/34.5 |
| 5,409,683 | 4/1995 | Tillotson et al. | 423/338 |
| 5,569,513 | 10/1996 | Fidler et al. | 428/36.5 |

FOREIGN PATENT DOCUMENTS 41 06 727  9/1992  Germany .
690888  4/1953  United Kingdom .

*Primary Examiner*—Rena L. Dye
*Attorney, Agent, or Firm*—Bacon & Thomas, PLLC

[57] ABSTRACT

System for thermal and/or acoustic insulation of a tube intended, for example, to allow the outflow of hydrocarbons originating from an oil deposit, consisting of a sleeve surrounding the tube over at least a part of its length. According to the invention, the sleeve consists of an aerogel. A method for thermal and/or acoustic insulation of a tube is also described.

12 Claims, 1 Drawing Sheet

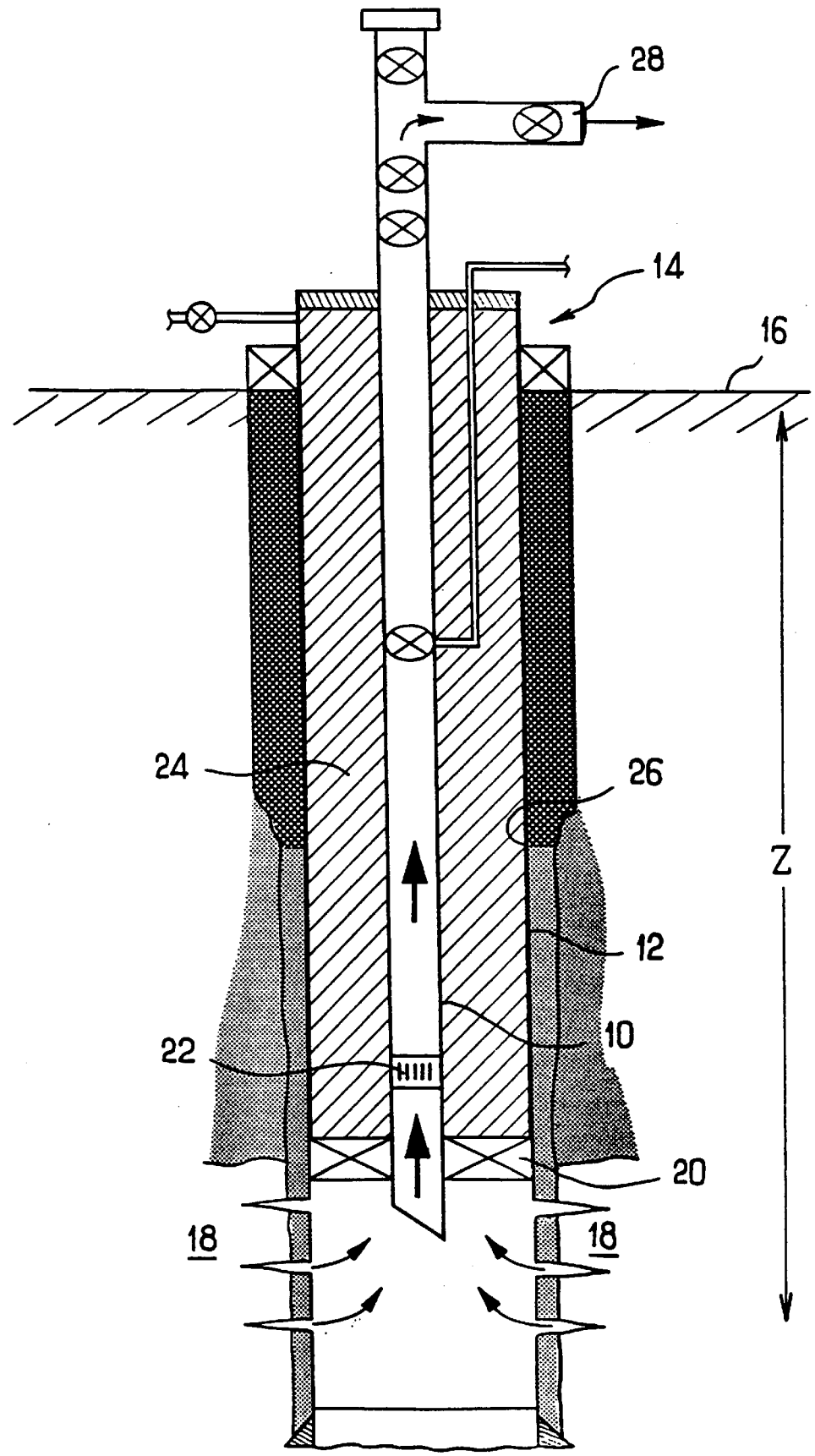

SYSTEM FOR THERMAL AND/OR ACOUSTIC INSULATION OF A TUBE

BACKGROUND OF THE INVENTION

1. Field of the Invention

The present invention relates to a system for thermal and/or acoustic insulation of a tube and, more particularly of a tube intended to allow the outflow of fluids, for example hydrocarbons originating from any source, for example an oil deposit.

2. Description of Related Art

Acoustic insulation is of interest above all for tubes which are close to living environments: overhead and submarine pipelines or pipeline networks buried in the ground. By way of example, in the case of high flow rates with a significant quantity of gas, the tubes and their singularities, such as bends, tees, valves, etc., generate levels of sound which are detrimental to man and the environment. Although currently not very practical, acoustic insulation contributes to human comfort, occupational safety and environmental protection.

When an oil deposit is brought into production, hydrocarbons flow through a tube, referred to as the production string, from the bottom of the well to the surface. At the bottom of the well, the pressure and the temperature are relatively high, for example 100° C. and 300 bar. When the hydrocarbons rise to the surface, this pressure and this temperature decrease, with the result that the output temperature of the well is, for example, of the order of 30° C.

The effect of this decrease in the temperature of the hydrocarbons in the production string is to increase the viscosity and the weight of these hydrocarbons, which may lead to their flow being slowed down. Furthermore, the temperature decrease may sometimes cause the deposition of hydrates or paraffins on the wall of the string. If it accumulates in the tube, this deposit may cause serious operating problems, such as slowing down the hydrocarbons or completely obstructing the tube. In general, an operator desiring to avoid these risks has to treat this deposition phenomenon, either preventively by injecting a chemical product which inhibits the deposition, or remedially by wiping or scraping the tube using special equipment, or else by heating it using a means which may be available. In all cases, these operations lead to considerable expenditure. This type of problem also occurs in the pipelines which join a well head to a remote processing centre.

The requirement for the outflow to remain cold may also arise when, for example, water is injected into the deposit from the surface. It is sometimes beneficial for the water not to be heated by the surrounding formations along this path, for example in order to maintain its weight or to cause certain thermal phenomena which promote injectability into the deposit (weakening the rock as a result of the low temperature with a view to thermally fracturing it). In this case, thermally insulating the tube makes it possible to reduce the time taken for the thermal phenomenon to occur and to keep conditions more constant during shut-downs, or to protect, around the tube, all the equipment which may be sensitive to thermal variations (contraction of the jacket, fracture of the cementing, etc.).

Some wells are located in regions where the ground temperature is very low. It has already been proposed to equip the production string with an electrical heating system in order to keep the temperature of the outflows constant. However, production, implementation and power consumption for this type of installation are very expensive, which greatly limits its usage.

Fitting thermal insulation around a tube or a production string, optionally coupled to an electrical or other heating system, makes it possible to keep the temperature of the outflows at a high value during their transfer, thus reducing the deposits on the wall of the column and other problems associated with temperature. It is known to use double-jacketed tubes and to use pumping to introduce a liquid loaded with solid particles, or a liquid gel, between the two walls from one of the ends of the tube. In the case of a well, the two walls in question are inherently present, one formed by the tubing and the other by the jacket.

This formulation, intended to stop natural convection within the liquid occupying the space separating the two walls, is relatively inexpensive to use because it generally avoids an elaborate operation of withdrawing the piping. However, its thermal insulation performance is mediocre because of the high residual conductivity of the medium, which is of the order of 0.6 W/m°C. when it is based on water and of the order of 13 W/m°C. when it is based on hydrocarbons (oil, gas oil, etc.). Furthermore, long-term stability of these formulations at a temperature of above 85° C. is difficult to obtain (sedimentation of the particles in the case of loaded liquids, loss of viscosity in the case of liquid gels).

It is also known to use a tube or a string with a double wall, constructed in sections in the workshop and in which, between the two walls, a high vacuum is made or a low-pressure rare gas (argon, xenon, or the like) is introduced. This type of tube affords a high degree of thermal insulation, but its complicated workshop construction is very expensive and its high external diameter considerably limits its usage. Furthermore, fitting it to a system which is already being used requires the existing tubes to be replaced, which considerably increases the cost of the insulation.

SUMMARY OF THE INVENTION

The subject of the present invention is therefore thermal and/or acoustic insulation for a tube, which gives very high performance and which can optionally be fitted on existing tubes without dismantling them.

To this end, the invention proposes a system for thermal and/or acoustic insulation of a tube, consisting of a sleeve surrounding the tube over at least a part of its length, characterized in that the sleeve consists of an aerogel.

The invention also proposes a method for thermal and/or acoustic insulation of a tube surrounded by a jacket, comprising the steps of:

forming a liquid gel from a precursor and a liquid, optionally replacing the liquid phase by a more volatile solvent, for the purpose of facilitating the drying stage, removing the solvent contained in the gel in order to form an aerogel.

The presence of an aerogel layer around the tube prevents convection currents from being formed in the medium surrounding the tube, the result of which is a substantial reduction in the heat-exchanges at the wall of the tube. Furthermore, the cells in the aerogel constitute successive flexible cushions which damp the sound waves propagating through them, the result of which is to attenuate the transmission of noise (acoustic insulation).

The optional ventilation of the aerogel consists in replacing the vapours of the solvent which has been used for drying by non-condensible gases with higher insulation properties (for example rare gases (argon, xenon) or nitrogen).

BRIEF DESCRIPTION OF THE FIGURE OF DRAWING

The characteristics and advantages of the present invention will emerge more clearly on reading the following description, made with reference to the appended drawings in which the single FIGURE is a schematic sectional view of a tube fitted with thermal insulation according to the invention, in the particular example of an oil well.

DETAILED DESCRIPTION OF THE INVENTION

As represented in the FIGURE, a tube which is a production string 10 in the example illustrated, extends in a well 12 between a well head 14, arranged at the surface of the ground 16, and an oil-bearing rock stratum 18. Towards its lower end, at a point slightly above a seal 20 arranged in the well 12, the production string includes a device 22 allowing fluids to be circulated. An annular space 24 defined between a jacket 26, which forms the wall of the well, and the production string 10 is delimited between the well head 14 and the seal 20. This space is generally full of liquid, for example soft water or gas oil, for example, or may contain gas.

The outflows, for example hydrocarbons, originating from a source constituted by the oil-bearing rock 18, rises through the production string 10 towards an outlet 28 located at the surface. In the example illustrated, the stratum 18 lies at a depth Z of 3,000 m, at which depth the hydrocarbons are at a temperature of 100° C. and under a pressure of 300 bar. In a conventional well, the hydrocarbons would be cooled as they rise, for example to a temperature of the order of 30° C. at the outlet 28.

According to the invention, in order to avoid this reduction in the temperature of the hydrocarbons as they rise through the string 10, with the deposits which may result therefrom, thermal and/or acoustic insulation is arranged in the annular space 24. This thermal insulation comprises an aerogel introduced from the surface into the annular space in the wall.

Manufacture of the aerogel starts with the manufacture of a liquid gel from a precursor and a liquid.

The precursor may consist of sodium silicate, with the liquid being water. However, its use may be time-consuming because it requires involved operations of washing the residual salts and water with alcohol.

The gel is preferably prepared in a non-aqueous medium, for example in alcohol, in particular methanol or ethanol. In this case, the precursor employed may be of the tetraethylorthosilicate (TEOS) type, optionally partially hydrolysed or polymerized. This type of gel is simpler and quicker to manufacture than gels prepared in the aqueous phase.

Finally, the liquid phase of the gel is replaced with a solvent designed for drying the gel. The solvent used is preferably $CO_2$ in liquid form. This operation of extracting one liquid solvent by another is carried out by percolation and diffusion of the second solvent within the gel.

Drying

The next step in the manufacture of the aerogel is that of drying the volatile solvent contained in the liquid gel. In order to obtain an aerogel, the liquid gel must always be kept at a pressure which guarantees that the solvent is in the liquid or supercritical state, which pressure depends on the actual temperature. Any subcritical vaporization of the solvent will destroy the structure of the gel, which must be preserved in order to obtain an aerogel. Subcritical vaporization would give a xerogel.

The pressure may be reduced only when the temperature has reached or has been increased to a suitable value above the critical temperature of the solvent contained in the gel.

For example, if the drying solvent is $CO_2$, its supercritical (or hypercritical) state will be reached above 31° C.

When this temperature is exceeded, the volume of gel in question is pressure-relieved slowly in order progressively to extract therefrom the solvent in supercritical form, characterized by perfect continuity between the liquid state and the gas state.

The temperature must be kept above the critical point until the end of the pressure-relieval, otherwise the cellular structure of the final dried product would be partially destroyed, resulting in a high degree of shrinkage and hardening (the product is then referred to as a xerogel). Once the pressure-relieval and solvent extraction have been completed, the optional heating systems can be stopped, on condition, however, that the equilibrium temperature resulting therefrom within the aerogel is such that, taking into account the pressure prevailing therein, all of the solvent contained therein residually after drying still remains in the form of gas without any condensation.

Ventilation

An additional step may be necessary in the method, depending on the conditions and the constraints involved in the use of the aerogel. If, for example, for a mechanical or hydraulic reason, the aerogel must be kept at a high gas pressure and be locally in contact with cold walls, a non-condensible gas made, for example, from argon, xenon, krypton, nitrogen or the like may prove necessary for replacing, in the cells, the residual drying gas constituted by the vapour of the solvent, for example $CO_2$ gas. Otherwise, there would be a risk of this vapour condensing locally, destroying the aerogel.

In order to carry out this replacement, it is possible either to perform circulation and flushing of the solvent vapour by the desired final gas, or to very strongly pressure-relieve the solvent vapour then recompress the volume with the desired gas to the intended pressure.

It is also possible to carry out a plurality of successive pressure-relievals, each followed by recompression through filling with an non-condensible gas, this being with the purpose of progressively increasing the proportion of non-condensible gas and thus removing essentially all the solvent vapour.

Vacuum techniques may also be employed, either for carrying out this replacement, or directly for guaranteeing, within the aerogel, a vapour pressure of solvent or other vapour such that in no case, in particular in the cooled regions, can the vapours in question condense.

In particular, these vacuum systems may be maintained when there is a fear of leaks originating from outside the volume, which could otherwise generate the formation of liquids.

This guarantees continuous removal of the inward leaks in a gas form without affecting the condition of the aerogel. However, this assumes that the support volume is kept in the required depressurized state, which depends on the coldest assumed temperature of the volume and the vapour pressure of the substance whose unintentional presence is feared (example: stream of water due to humidity).

Heating Means

Several steps in the method according to the invention require heat to be supplied to the products in question, for example the gelling and drying steps.

In the variants of the method which are described here, for which these steps are provided in situ in the space (24), the invention proposes, for example, to use electrical heating systems which are sometimes provided in the design of the tube, or to employ the circulation of a fluid at the appropriate temperature, hot or cold, depending on the requirements in question inside the tube. In the example of an oil well, the geothermal heat in the hot formations around the well will be a first source of heat, and the bringing into production of the well via the interior of the tube will be a second source. Injecting a hotter or colder fluid in the opposite direction into the tube will optionally make it possible to set the temperature in the space (24) to the required value.

Fitting

The product may be fitted into the annular space 24 intended to contain the aerogel, which is the final product of the insulation method described here, according to choice at different stages in its manufacture. The choice is to be made depending on the characteristics of its destination: mechanical strength of the walls, wall temperature, heating possibilities, accessibility, possibilities of pumping or blowing, logistics and transport means on site, etc.

The choice may be made with a view to maximizing economy in the cost of the final result or in technical performance criteria or operational safety criteria.

Whatever the manufacturing stage chosen for carrying it out, fitting of the product is achieved when all the space intended to receive an insulating aerogel is filled with the said product. The next step in the process for manufacturing and ventilating the aerogel described elsewhere is then carried out, which step depends on the stage chosen for fitting the product.

Fuller details regarding the specifications relating to the manufacturing stage in which the choice is made to carry out fitting will emerge on reading the following description.

A first procedure consists in placing, around the tube, aerogel sleeves prefabricated in segments with the required dimensions. However, this method is applicable only to tubes for which direct accessibility is possible, that is to say tubes which are unjacketed or are positioned perfectly over their entire length relative to their outer jacket.

A second procedure consists in blowing-in fragments of prefabricated aerogel whose dimensions allow them to flow in this way through the annular space for which they are intended. By way of example, one procedure is first to make a vacuum allowing the annular space itself then to cause suction of these aerogel fragments.

The drawback of these first two methods may reside in the fragility in transport and in handling of the possibly expensive prefabricated aerogel elements, in the partial destruction which may occur during these operations, and furthermore in the inflexibility of these products, which reduces their capacity to match efficiently the shape of the space which is intended for them.

These are some of the reasons why the invention also provides the possibility of carrying out or completing manufacture of the aerogel in situ in the annular space 24 where it is intended to be placed. From this point of view, the step of drying the aerogel is a key step determining the physical state (solid or gel, possibly non-gelled liquid) in which the product is found when it is transferred into the intended location around the tube. Thus, all the methods of carrying out this transfer of the product which are described below provide, in contrast to the above two, that the product be fitted before it is dried. This drying will therefore have to take place at the location intended for the aerogel around the tube, which, in this case, will necessarily be a space contained between two walls.

When it is fitted, the product is, depending on the case, therefore presented now in the state of a liquid mixture or of a relatively viscous gel. In all cases, the product is then injected from the container holding it towards the annular space (24) intended to receive the insulating aerogel. If need be, the fluid occupying this space (24) at the start of this operation is flushed out at the same time, optionally by making use of the circulation device (22) if the latter has been provided, which hydraulically connects the space (25) to the interior of the tube (10). This makes it possible to set up circulation from one end of the space (24) to the other, in either direction. This direction is determined as a function, for example, of the densities of the fluids to be flushed out compared to that of the product to be fitted, or depending on the pressure stability of the walls compared to the pressures required for propelling the fluids during the operation, in order to overcome the head losses created.

It is also possible, for example, in the absence of the hydraulic connection device (22) or in order to avoid requisitioning the tube (10) for this transfer operation, to evacuate the annular space (24) beforehand, which if appropriate assumes that it is dried by evaporating the possible liquids initially occupying this space. This preparation also makes it possible to ensure very efficient filling of the space (24) by the product when it is injected, affording optimum insulation performance of the final aerogel when installed. Furthermore, evacuation will facilitate extraction of the product from the container towards the space (24). In some cases, this may avoid the use of a circulation or boost pump when transferring the product.

A third procedure may also be indicated, in which the product is fitted in the state of a gel ready for drying, the washing step being completed beforehand, that is to say that all the solvent contained in the gel is volatile solvent, for example $CO_2$, or a suitable mixture of alcohol and $CO_2$, defined as a function of the drying conditions which it has been possible to use in situ throughout the space (24) where the presence of the insulating aerogel is intended.

This method is very beneficial because it guarantees the quality of the gel and its solvent before fitting, this fitting being carried out more easily than in the solid state and being capable of being followed directly by supercritical drying after optional heating of the gel.

However, possible drawbacks of this method are the technical constraint and the cost of preparation, storage, transport and fitting of the gel ready for drying, for which it is necessary to guarantee specific temperature and pressure conditions. For example, if the drying solvent is $CO_2$, the gel ("carbogel") will possibly be transported and stored in a bottle which is at 20 bar and is refrigerated to −20° C.

Similarly, in order to maintain the integrity of the gel, it may be preferable to keep it in the subcritical liquid state, that is to say a temperature lower than the critical temperature and a pressure which is sufficient to avoid the appearance of gas bubbles, until it has been fitted. This may be difficult for hot wells, for example, which is a justification for not completely replacing the liquid by the volatile solvent after the gel has been fitted into the space (24).

Thus, the invention provides a fourth embodiment, in which the gel is fitted in the same way as described above, but the degree to which it has been processed is less advanced, the purpose of this being to simplify and reduce the cost of its prefabrication, storage, transport and fitting into the space 24. The consequence of this is that some or all of the step described elsewhere for replacing the liquid contained in the gel by a solvent suitable for drying must be carried out in situ in the space 24. To this end, as for transferring the gel into the space 24, various procedures may be adopted: either by using the tube and the device (22) to establish circulation allowing progressive extraction of the liquid to be replaced, or by heating the gel to above the critical point of the liquid which it contains, then compression while forcing the drying solvent, for example $CO_2$, into the gel, then partial pressure-relieval such that the mixture in the gel is never in the subcritical gas state. Successive compression then pressure-relieval is then thus carried out above the critical point.

In both cases, this step of replacing the solvent ends when analysis of the fluid recovered at the end of the space 24 indicates a composition for the fluid contained in the gel which corresponds to the desired drying solvent.

There may also be problems associated with transporting, storing and pumping gels. The invention thus proposes a fifth embodiment, in which gelling is carried out in situ in the annular space (24) intended for the aerogel. The advantage of this method resides in the ease of pumping and extracting non-viscous products from the container which has been used to bring them to the fitting site. There may also be advantages regarding the thermal or mechanical specifications (for example thermal stabilities and/or resistance to pressure and heat-production and/or pressurization systems) which may be required regarding the enclosure where the gelling is carried out, and that it may be less expensive to do this for the final enclosure provided between the walls of the tube than for a container used only for preparing the gel and transporting it.

In this case, the constituents which allow the gel to be formed are mixed as they are pumped into the volume where the aerogel is to be placed. The precursor and possible additives are added upstream or downstream of the pump, depending on which of the two solutions is considered preferable as regards, for example, safety of the operation or the quality of the mixing thus produced. Once the fitting of the mixture into the space (24) using one of the described methods is completed, the time required for gelling is waited, while putting into service the possible heating means intended for this purpose.

It should be noted that it is also possible to recondition the aerogel in situ, by carrying out the above-described supercritical drying step twice in succession, a first time in reverse order in order to redissolve or rewet the aerogel and thus make it more malleable, and a second time, in normal order, in order to redry it, after optional supplementing with a similar gel. This operation allows the monolithic structure of the aerogel to be reconstituted relatively completely, and thus to regain good thermal and acoustic insulation characteristics if they have been degraded in some way during usage of the tube.

This procedure also affords the possibility of extracting the aerogel from the well in order to transfer it to a different container or to transport it with a view to using it or storing it on a different site.

It can thus also be recovered and fitted after an operation to carry out work which has made its withdrawal necessary.

I claim:

1. System for thermal insulation of a production string in an oil well, comprising a sleeve surrounding the production string over at least a part of its length and filling the annular space between the production string and the wall of the oil well, wherein the sleeve consists of an aerogel formed in situ around the production string.

2. Insulation system according to claim 1, wherein the aerogel is formed from a precursor which comprises tetraethylorthosilicate.

3. Insulation system according to claim 1, wherein the aerogel is formed by forming a liquid gel from a precursor and a liquid, replacing the liquid phase by a more volatile solvent and removing the solvent contained in the gel to form the aerogel.

4. Insulation system according to claim 3, wherein the precursor is sodium silicate and the liquid is water.

5. Insulation system according to claim 3, wherein the precursor is tetraethylorthosilicate and the liquid is alcohol.

6. A method for thermal insulating a production string in an oil well comprising forming an aerogel sleeve in situ surrounding the production string over at least one part of its length, in the annular space between the production string and the wall of the oil well.

7. The method according to claim 6, wherein the aerogel is formed by forming a liquid gel from a precursor and a liquid, replacing the liquid phase by a more volatile solvent and removing the solvent contained in the gel to form the aerogel.

8. The method according to claim 7, wherein the precursor comprises tetraethylorthosilicate.

9. The method according to claim 7, wherein the precursor is sodium silicate and the liquid is water.

10. The method according to claim 7, wherein the precursor is tetraethylorthosilicate and the liquid is alcohol.

11. The method according to claim 6, further comprising evacuating the annular space between the production string and the wall of the oil well before forming the aerogel sleeve.

12. The method according to claim 6, wherein the aerogel sleeve is formed in situ surrounding the production string in the annular space between the production string and the wall of the oil well by introducing the gel which has been formed by replacing the liquid phase of the liquid gel with a more volatile solvent into said annular space and removing the solvent contained in the gel to form the aerogel.

* * * * *